United States Patent
Kim et al.

(10) Patent No.: US 8,171,218 B2
(45) Date of Patent: May 1, 2012

(54) MEMORY CARD SYSTEM, MEMORY CARD AND METHOD FOR EXECUTING AN APPLICATION PROGRAM THEREON

(75) Inventors: Gwang-Myung Kim, Suwon-si (KR); Tae-Hyun Yoon, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 510 days.

(21) Appl. No.: 11/588,493

(22) Filed: Oct. 28, 2006

(65) Prior Publication Data

US 2007/0168613 A1 Jul. 19, 2007

(30) Foreign Application Priority Data

Jan. 17, 2006 (KR) .................. 10-2006-0005039

(51) Int. Cl.
G06F 12/00 (2006.01)
(52) U.S. Cl. ........ 711/115; 711/100; 711/145; 711/151; 711/154; 711/163
(58) Field of Classification Search .................. 711/115, 711/100, 145, 151, 154, 163
See application file for complete search history.

(56) References Cited

U.S. PATENT DOCUMENTS 7,665,098 B2 * 2/2010 Kavalam et al. ............. 719/328
7,680,975 B2 * 3/2010 Tanigawa ..................... 711/103
2008/0086693 A1 * 4/2008 Jogand-Coulomb et al. . 715/744
2009/0020602 A1 * 1/2009 Pratone ........................ 235/380
2010/0146202 A1 * 6/2010 Nystad et al. ................ 711/108

FOREIGN PATENT DOCUMENTS

| JP | 2002 358486 | 12/2002 |
| JP | 2003 123031 | 4/2003 |
| KR | 2004 0078901 | 9/2004 |
| KR | 2005 0021922 | 3/2005 |

OTHER PUBLICATIONS

English Abstract for Publication No. 2002-358486.
English Abstract for Publication No. 2003-123031.
English Abstract for. Publication No. 1020040078901.
English Abstradt for Publication No. 1020050021922.

* cited by examiner

Primary Examiner — Midys Rojas
(74) Attorney, Agent, or Firm — F. Chau & Associates, LLC

(57) ABSTRACT

A memory card system and memory card. The memory card system may include a host and a memory card able to be received by the host. The memory card may transfer an application program index to the host in response to a command from the host. Time spent finding information relating to the application programs loaded in the memory card may be saved and a convenient and efficient interface may be provided to a user.

23 Claims, 5 Drawing Sheets

MEMORY CARD SYSTEM, MEMORY CARD AND METHOD FOR EXECUTING AN APPLICATION PROGRAM THEREON

CROSS-REFERENCE TO RELATED APPLICATIONS

The present application claims priority under 35 U.S.C. §119 to Korean Patent Application No. 2006-05039 filed on Jan. 17, 2006, the entire contents of which are hereby incorporated by reference.

BACKGROUND

1. Technical Field

The present invention relates to memory cards having semiconductor memory devices and in particular, to a memory card system and method for executing an application program thereon.

2. Discussion of the Related Art

As with personal computers, commercial utilities for various digital electronic machines such as digital cameras, personal digital assistants (PDA), digital audio players, mobile phones, and so forth are increasing. Digital electronic machines often have devices for storing data. Computer systems may use hard disks as storage units, but other kinds of electronic apparatuses may be equipped with semiconductor memories for storage media to reduce overall volume and weight and thereby increase their portability.

A storage medium with a semiconductor memory such as a memory card may conveniently be carried by a person and may be easily removed from a digital electronic machine. Such a storage medium may be fabricated in the form of card for simplicity and stable portability even when it is being removed from its machine. A digital electronic machine into which the semiconductor memory card (e.g., nonvolatile memory card) is operatively inserted may be referred to herein as a "host." Examples of hosts include a personal computer, a digital camera, digital camcorder, digital music player, personal digital assistant (PDA) and so on.

A nonvolatile memory card may be capable of retaining data even without power supply. In addition, the nonvolatile memory card has the benefit of its small size and large data storage capacity. The nonvolatile memory card (e.g., an IC card) may be used in a system requiring security such as credit card and banking transactions.

Upon connecting a conventional nonvolatile memory card to a host, the host may not be able to easily determine what kinds of application programs are installed on the nonvolatile memory card. Therefore, the host may have to execute all the application programs installed on the memory card to identify what applications may be installed thereon. For example, the host may send commands for executing the application programs on the memory card. Then, the host may determine the presence of the corresponding application program by receiving responses from the memory card.

Therefore, the conventional approach may place too heavy a burden on the host and efficiency of the card system may be degraded as the host executes all of the application programs on the nonvolatile memory card to determine what supportable application programs may be installed.

SUMMARY OF THE INVENTION

Embodiments of the present invention are directed to a memory card and memory card system capable of finding an index of application programs installed in the memory card.

According to an embodiment of the present invention, a memory card system may include a host and a memory card connected to the host. The host may request an application program index of the memory card.

The memory card may comprise a central processing unit processing the request for the application program index by the host, a memory unit, controlled by the central processing unit, storing the application program index, and an input/output unit, controlled by the central processing unit, sending output signals with the application program index to the host.

The output signals may include responding signals and data.

The input/output unit may comprise a command signal line accepting commands from the host and transferring responding signals to the host in response to the commands, and a data signal line exchanging data with the host.

The central processing unit may send the responding signals with the application program index through the command signal line.

The central processing unit may send the data with the application program index through the data signal line.

The memory card may be, for example, a multimedia card or a secure digital card.

The host may comprise a controller sending a command and accepting the application program index. The controller may execute at least one application program from the application program index.

The host may additionally comprise a display unit, regulated by the controller, showing the application program index on a screen and an input unit accepting a selection signal from a user in response to the showing of the application index on the screen of the display. The controller may execute an application program in response to the selection signal.

A memory card system may comprise a memory card and a host requesting an application program index from the memory card. The memory card may transfer the application program index to the host in response to the request for the application program index.

A memory card may comprise a memory unit storing an application program index, a central processing unit writing and/or reading data to/from the memory unit in response to commands input from an external source, and an input/output unit controlled by the central processing unit for transceiving (sending and/or receiving) the commands and data. The central processing unit may send the application program index to an external system in response to one of the commands that request the application program index.

The input/output unit may comprise a command signal line accepting the commands and transferring responding signals for the commands, and a data signal line transceiving the data.

The central processing unit may send the application program index to the command signal line.

The central processing unit may send the application program index to the data signal line.

An embodiment of the present invention also provides a method of performing an application program comprising requesting an application program index from a memory card, accepting the application program index, showing the application program index on a display unit, receiving, from a user, a signal, which selects at least one application program of the application program index, and executing the selected application program in response to the selection signal.

Still another embodiment of the invention provides a method of performing an application program comprising requesting an application program index from a memory card, accepting the application program index, and executing at least one application program from the application program index.

A further understanding of the several embodiments of the inventions herein may be realized by reference to the remaining portions of the specification and the attached drawings.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified. In the figures.

DETAILED DESCRIPTION OF EXEMPLARY EMBODIMENTS

Embodiments of the invention will be described below in more detail with reference to the accompanying drawings. The invention may, however, be embodied in different forms and should not be constructed as limited to the embodiments set forth herein.

Figure 1:
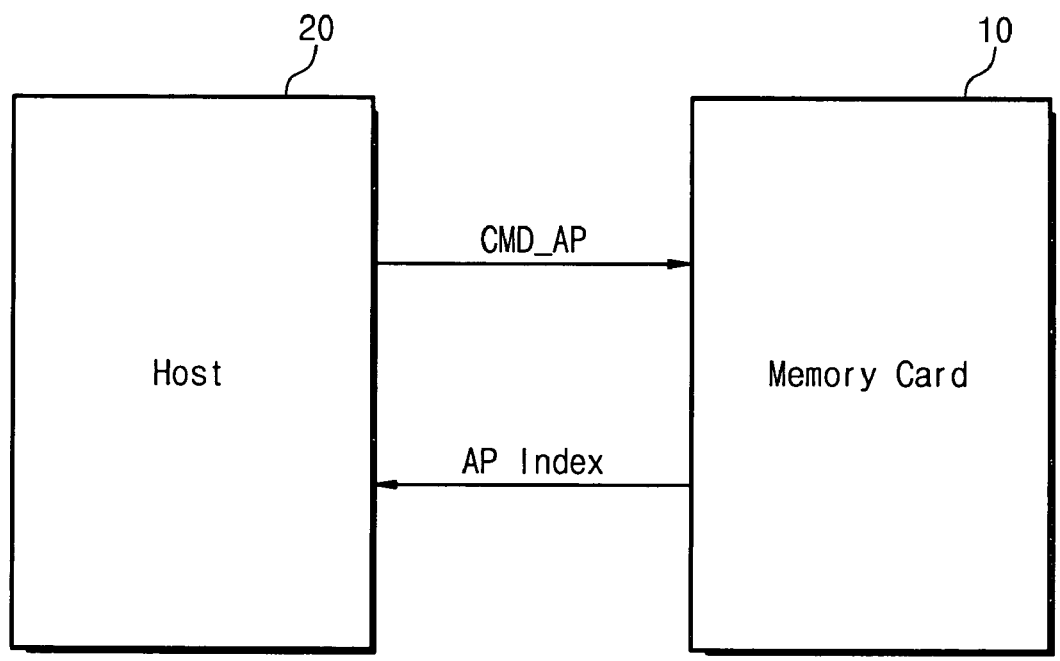
FIG. 1 is a block diagram schematically showing a memory card system in accordance with an embodiment of the invention.

FIG. 1 is a block diagram schematically showing a memory card system in accordance with an embodiment of the present invention. Referring to FIG. 1, the memory card system may be comprised of a memory card 10 and a host 20. The memory card 10 shown in FIG. 1 may be, for example, a multimedia card (MMC), secure digital (SD) card, MiniSD, MicroSD, Memory Stick, Compact Flash card, or any other memory card presently available or in development.

An MMC, among such memory cards, is a device capable of reading/writing data and executing security operations in response to commands issued by an externally connected host. The host 20 is, for example, a mobile phone, a personal digital assistant (PDA), a personal computer, a digital media player (e.g., MP3 player), a still camera, a video camera, an automated teller machine (ATM), and so forth. The host 20 may request an application program (AP) index from the memory card 10 before executing an application program installed on the memory card 10. For example, the host 20 may send a command CMD_AP, for requesting an AP index, to the memory card 10. Then, the memory card 10 may transfer an AP index to the host 20 in response to the command CMD_AP. Thereby, a system and method capable of improving operational efficiency and implementing convenient user interface may be provided.

Figure 2:
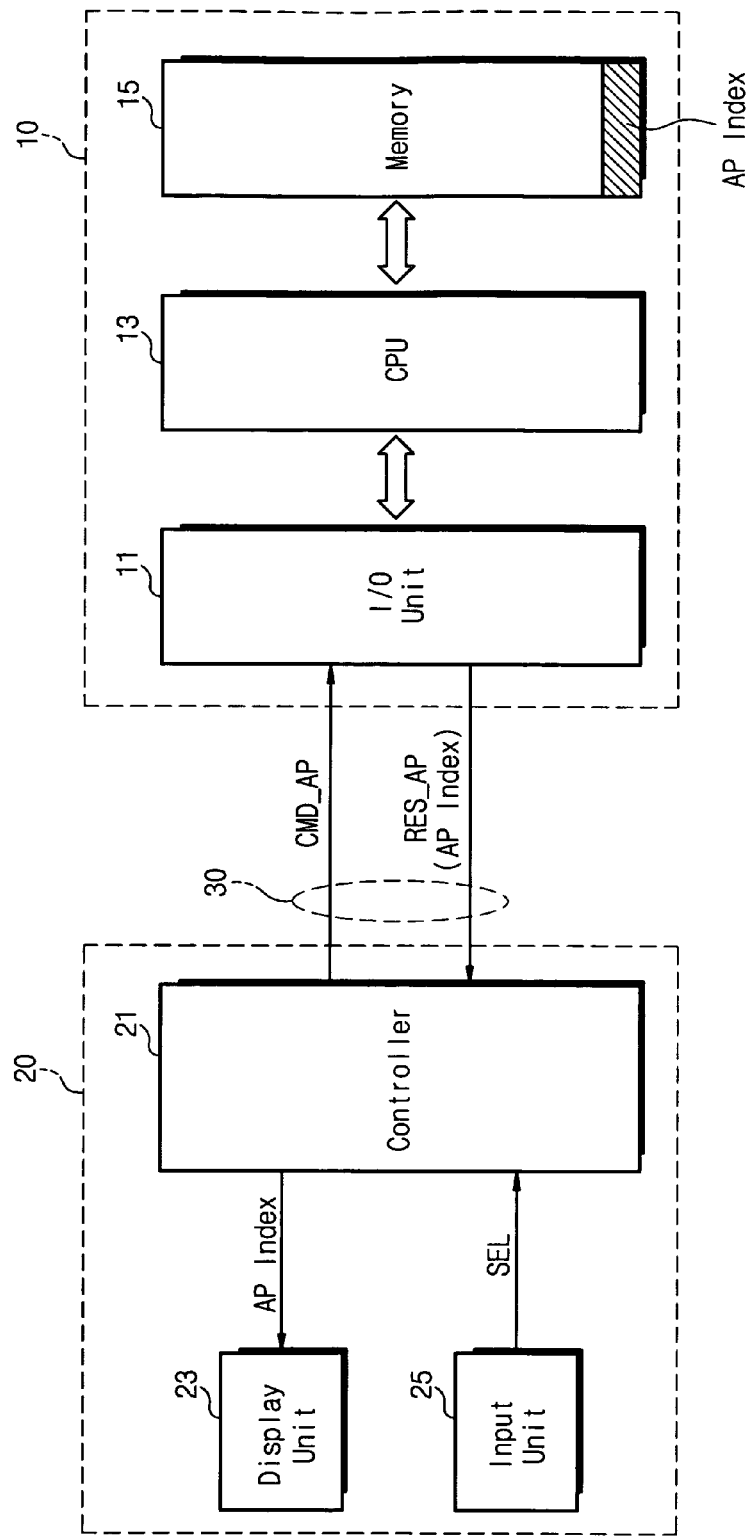
FIG. 2 is a block diagram illustrating the memory card system in accordance with an embodiment of the invention.

FIG. 2 is a block diagram illustrating a memory card system in accordance with an embodiment of the invention. Referring to FIG. 2, the memory card 10 may be comprised of an input/output (I/O) unit 11, a central processing unit (CPU) 13, and a memory unit 15. The memory unit 15 may be comprised of a nonvolatile memory device such as flash memory. The memory unit 15 may store and output data in compliance with instructions send from the CPU 13. The CPU 13 may control the components of the memory card 10, for example, the I/O unit 11 and the memory unit 15. The CPU 13 may execute the commands (CMD) transferred to the memory card 10 from the host 20. The I/O unit 11 may function as an external interface, including signal lines (e.g., command and data signal lines) for exchanging I/O signals with the host 20.

The host 20 may be comprised of a controller 21, a display unit 23, and an input unit 25. The display unit 23 may be, for example, a CRT monitor, OLED display, electronic paper, or an LCD display. The input unit 25 may be, for example, a keyboard, keypad, mouse, touch-screen or voice recognition device. The host 20 may further include an electroacoustic unit (not shown), for example, a speaker. The controller 21 may regulate the display unit 23 and the input unit 25, generate the command (CMD) to be applied to the memory card 10, and processes responding signals RES and data (DATA) output from the memory card 10.

The memory card 10 may contain various kinds of application programs (APs). These APs may be, for example, CPRM (content protection for recordable media) and/or Digital Rights Management (DRM) applications for controlling access to and usage of digital content and data stored in the memory card 10, banking programs for accessing an account with banks through the internet, gaming and wagering (e.g. gambling) programs, and so forth. Such APs of the memory card 10 may provide various service systems to users, for example, by associating with corresponding APs of the host 20. As an example, if a user connects the memory card 10 to the host 20, for an internet banking service, the host 20 may carry out initialization for communication with the memory card 10. Thereafter, the host 20 may send the command (CMD) to the memory card 10 for the banking service. If there is a responding signal (RES) from the memory card 10, the host 20 may execute an AP for providing the corresponding banking service.

The CPU 13 of the memory card 10 shown in FIG. 2 may process I/O signals (e.g., commands, responding signals, and data) exchanged with the host 20 through the I/O unit 11. For example, the CPU 13 may interpret the commands (CMD) applied from the host 20, and execute writing/reading operations to the memory unit 15 in accordance with a result of interpreting the commands (CMD). The CPU 13 may conduct operations for data transmission, data processing, and application programs. The CPU 13 may include additional ROM and/or RAM for storing an operating system (OS) program and supporting APs.

The memory unit 15 of the memory card 10 may store a plurality of APs such as, for example, the aforementioned CPRM, banking, and gaming programs, and an AP index. The AP index may also be stored in another storage unit (e.g., register) in the CPU 13. Each AP may be a file made up of one or more, for example two, component APs, for example, one component AP may be executed by the CPU 13 of the memory card 10 and the other component AP may be executed by the controller 21 of the host 20.

The AP index may be formed from a file containing information about the APs installed in the memory card 10. For example, the APs may be organized as shown in Table 1.

TABLE 1

| Bit number | AP title |
|---|---|
| Bit 0 | CPRM |
| Bit 1 | Game 1 |

TABLE 1-continued

| Bit number | AP title |
| --- | --- |
| Bit 2 | Game 2 |
| ... | ... |
| Bit 31 | Banking 2 |

In Table 1, a single word (32 bits) may be used to represent the status of, for example, a total of 32 APs. The AP index need not be restrictive in format, but may be variable in bit number according to requirements. In the case of constituting the AP index as like Table 1, the AP index may be defined in the specification of the memory card.

Figure 3:
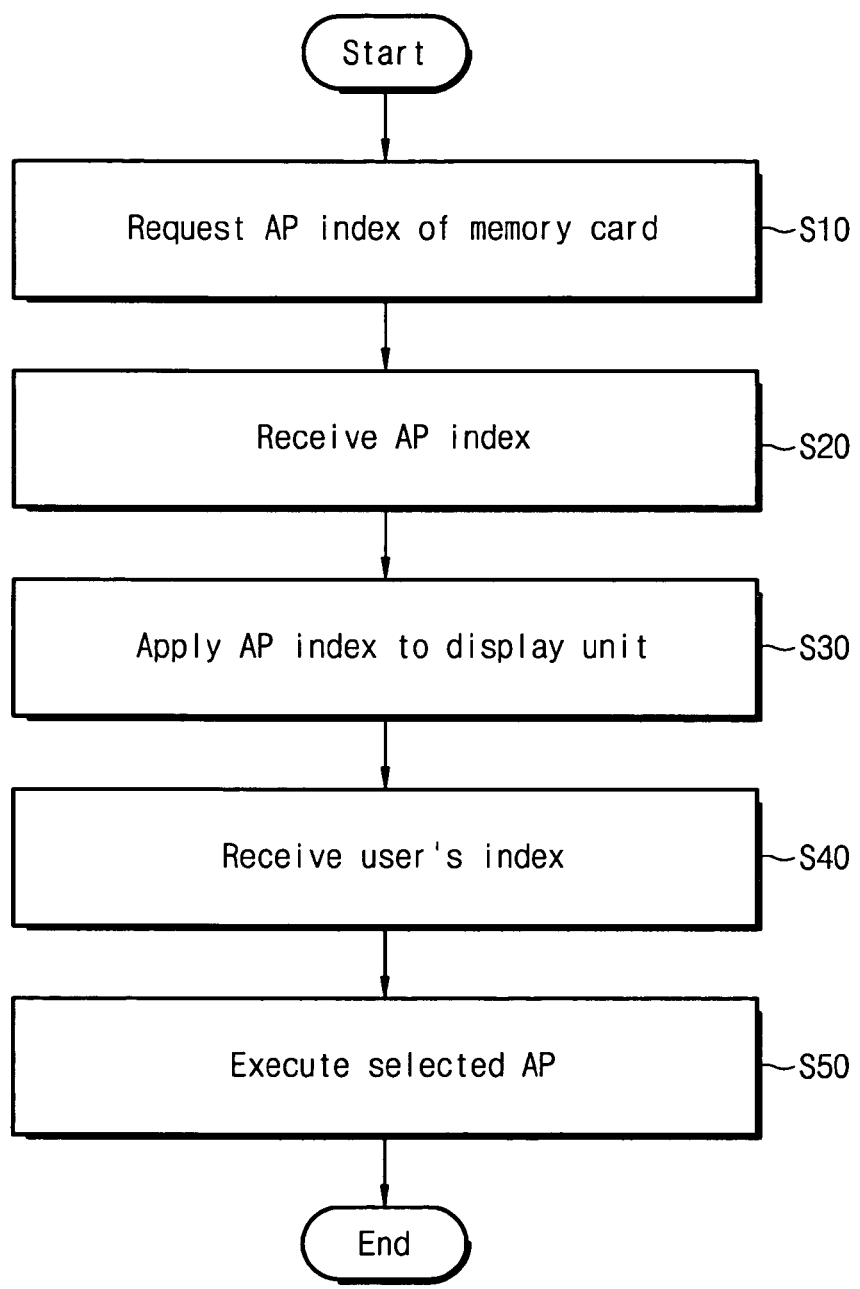
FIG. 3 is a flow chart showing a procedure for executing an application program in accordance with an embodiment of the invention.

FIG. 3 is a flow chart showing a procedure for executing an AP in accordance with an embodiment of the invention. Referring to FIG. 3, when the memory card 10 is connected to the host 20, the host 20 may carry out initialization for identifying the kind of the memory card 10 used and optimizing a communication protocol. After completing the initialization, the host 20 may send the command CMD_AP, through a command signal line 30, for requesting the AP index from the memory card 10 (Step S10). The CPU 13 of the memory card 10 may read the AP index from the memory unit 15 or an internal register (not shown). The CPU 13 may send the AP index, for example, by appending it to a responding signal RES_AP, to the host 20 through the command signal line 30 (Step S20). The controller 21 of the host 20 may extract the AP index from the responding signal RES_AP and transfer the AP index to the display unit 23 (Step S30). A user may then use the input unit 25 to select a specific service item from the AP index shown on the display unit 23 (Step S40). The controller 21 may transfer a command for executing the corresponding service to the memory card 10 in response to the selection signal SEL from the input unit 25 (Step S50). The CPU 13 of the memory card 10 may read the AP from the memory unit 15 for conducting the service selected by the user, and send the host 20 information used for executing the AP through the data signal line (DATA).

The host 20 may also be able to conduct steps S10 through S30 during the initialization.

Figure 4:
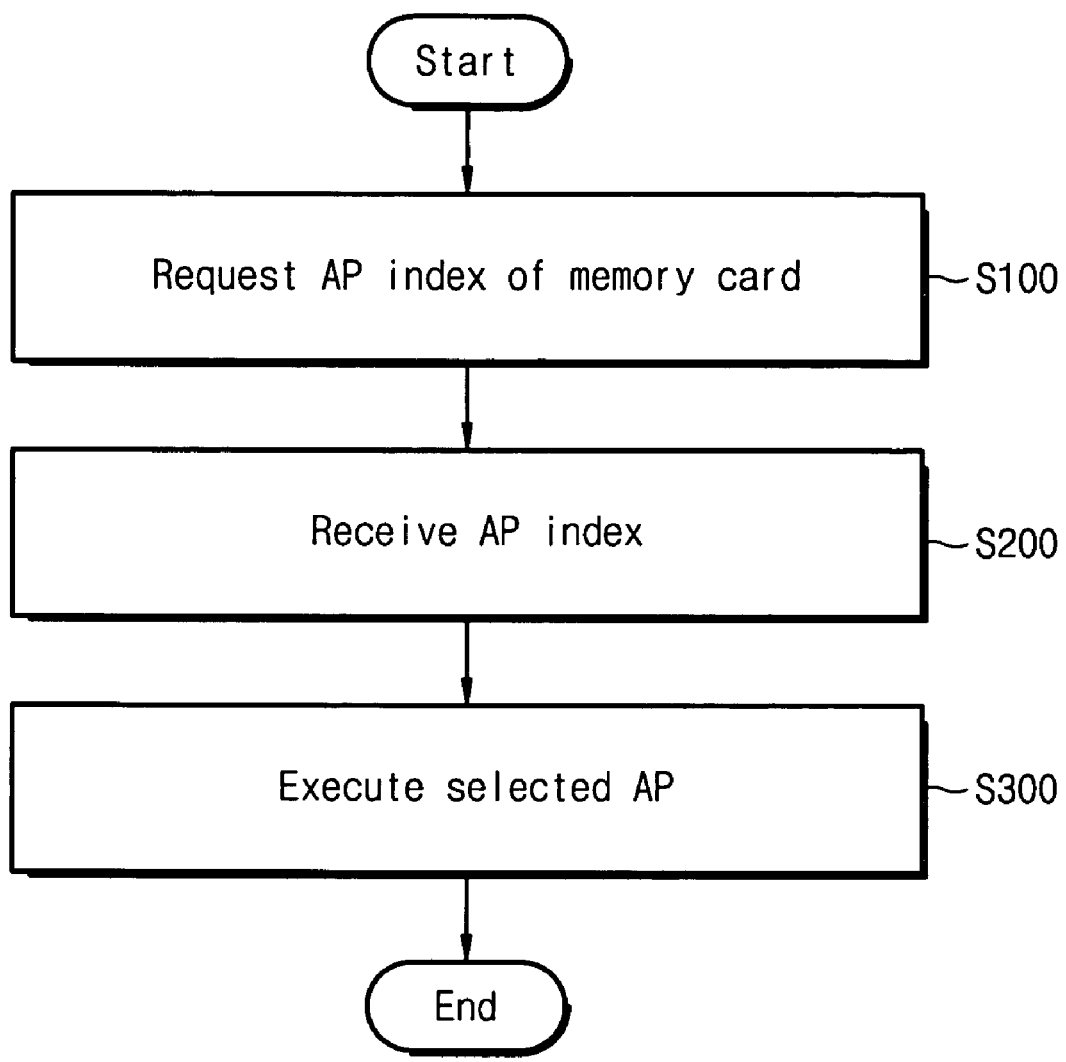
FIG. 4 is a flow chart showing a procedure for executing an application program in accordance with another embodiment of the invention.

FIG. 4 is a flow chart showing a procedure of executing an AP in accordance with another embodiment of the invention. Referring to FIG. 4, the host 20, after or during the initialization, may send the command CMD_AP for requesting the AP index from the memory card 10 (Step S100). The CPU 13 of the memory card 10 may read the AP index from the memory unit 15 or an internal register (not shown). The CPU 13 may continuously or periodically send the AP index to the host 20 through the command signal line 30 (Step S200), for example, by appending it to a responding signal RES_AP for the command CMD_AP. The controller 21 of the host 20 may abstract/analyze the AP index from the responding signal RES_AP and then execute the specific AP (Step S300).

Figure 5:
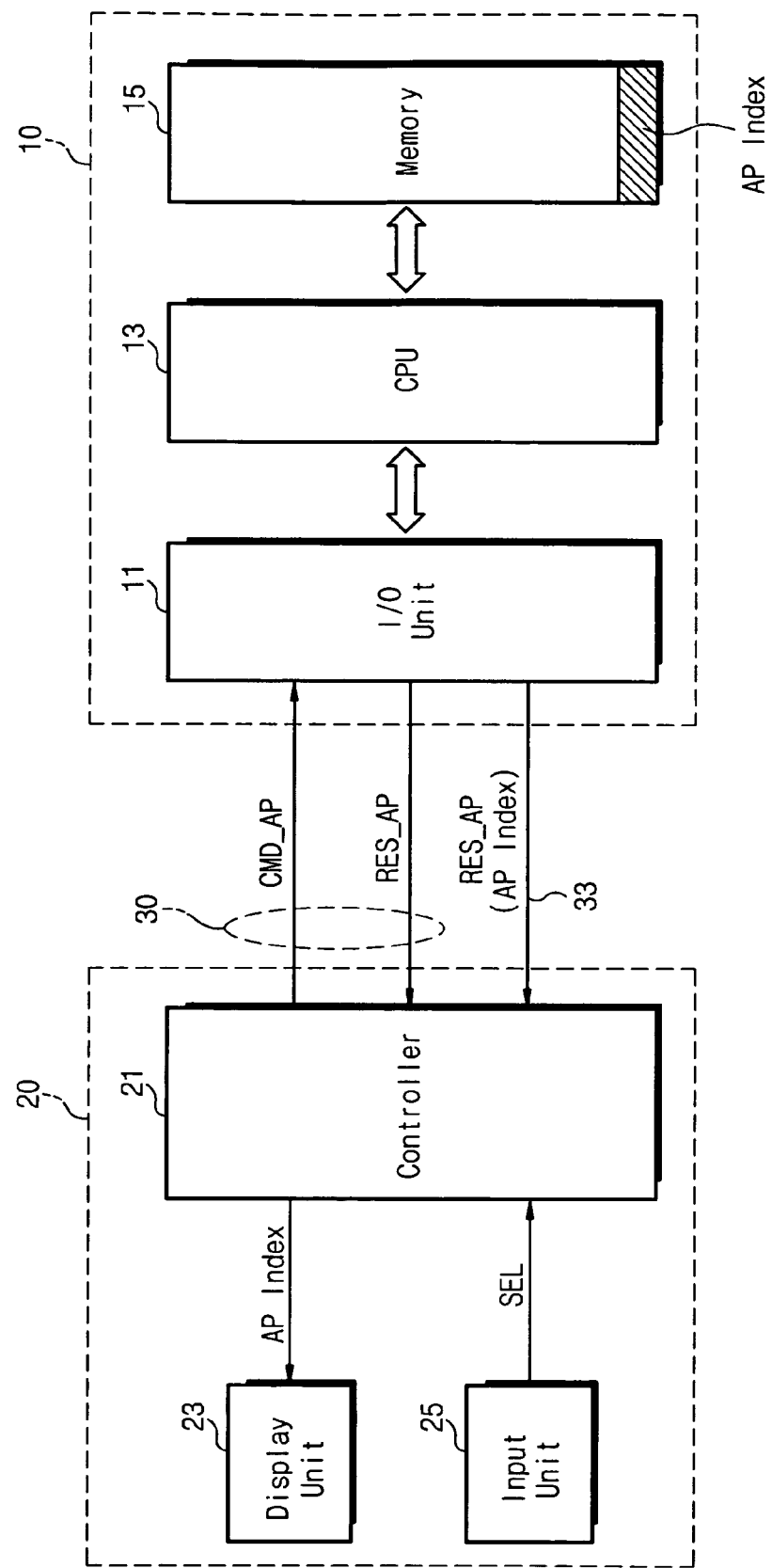
FIG. 5 is a block diagram illustrating a memory card system in accordance with another embodiment of the invention.

FIG. 5 is a block diagram illustrating a memory card system in accordance with another embodiment of the invention. The host and memory card shown in FIG. 5 may be organized with a similar structure as that shown in FIG. 2. However in this case, in the memory card 10, the AP index may be transferred to the host from the memory unit 15 or another storage unit of the CPU 13, e.g., a register (not shown). For example, if the host 20, after or during the initialization, sends the command CMD_AP for requesting the AP index from the memory card 10 (Step S10, Step S100), the CPU 13 may read the command CMD_AP and send the responding signal RES_AP corresponding to the command CMD_AP. Thereafter, the CPU 13 may read the AP index from the memory unit 15, convert it to the form for data DATA_AP, and then send the AP index data DATA_AP to the host 20 through a data signal line 33 (Step S20). The controller 21 of the host 20 may extract the AP index from the data DATA_AP and transfer the AP index to the display unit 23 (Step S30). Other operations of the system shown in FIG. 5 may be similar to those of the embodiments described above with reference to FIGS. 2 and 3.

Further, the controller 21, after receiving the data DATA_AP with the AP index, may extract the AP index from the data DATA_AP and execute the selected one of the APs included in the AP index (Step S300).

Because the host accepts an AP index from the memory card and directly executes the selected APs installed in the memory card, the burden placed on the host for finding information about kinds of the APs installed on the memory card is reduced. Moreover, the user may be provided with a convenient user interface.

As the host transfers a command, for example, a command for requesting an AP index from the memory card, to the memory card and as the host receives the AP index installed in the memory card, the time and burden in finding information about APs is reduced.

In addition, since the memory card system provides an AP index before executing an AP, it is possible to offer an efficient and convenient interface for a user.

The above-disclosed subject matter is to be considered illustrative, and the present invention should not be limited to the illustrated examples and may include modifications and variations apparent to those skilled in the art. It is to be understood that any of the above-disclosed features from the various disclosed embodiments of the present invention may be joined in any possible combination and the above-disclosed features should not be understood as limited to the embodiment for which they were described. The appended claims are intended to cover all such modifications, enhancements, combinations and other embodiments, which fall within the true spirit and scope of the present invention.

What is claimed is:

1. A memory card system comprising:
    a memory card;
    an application program index residing within the memory card, the application program index comprising a list of application programs stored on the memory card; and
    a host;
    wherein the host requests the application program index from the memory card and identifies application programs that are stored on the memory card from the application program index, and
    wherein the application program index comprises a single word of a predetermined number of bits, each bit of the application program index corresponding to an application program and indicating whether the corresponding application program is or is not installed on the memory card.

2. The memory card system as set forth in claim 1, wherein the memory card comprises:
    a central processing unit processing the request for the application program index sent by the host;
    a memory unit controlled by the central processing unit, storing the application program index; and
    an input/output unit controlled by the central processing unit sending host output signals with the application program index.

3. The memory card system as set forth in claim 2, wherein the output signals include responding signals and data.

4. The memory card system as set forth in claim 2, wherein the input/output unit comprises:
   a command signal line accepting commands from the host and transferring responding signals to the host in response to the commands; and
   a data signal line exchanging data with the host.

5. The memory card system as set forth in claim 4, wherein the central processing unit sends the responding signals with the application program index through the command signal line.

6. The memory card system as set forth in claim 4, wherein the central processing unit sends the data with the application program index through the data signal line.

7. The memory card system as set forth in claim 1, wherein the memory card is a multimedia card or a secure digital card.

8. The memory card system as set forth in claim 1, wherein the host comprises a controller sending a command and accepting the application program index,
   wherein the controller executes at least one application program of the application program index.

9. The memory card system as set forth in claim 8, wherein the host further comprises:
   a display unit regulated by the controller, showing the application program index on a screen; and
   an input unit accepting a selection signal for selecting at least one of application programs of the application program index from a user,
   wherein the controller executes the selected application programs in response to the selection signal.

10. The memory card system as set forth in claim 1, wherein the memory card transfers the application program index to the host in response to the request for the application program index.

11. The memory card system of claim 1, wherein the list of application programs stored on the memory card includes a list of the titles of the application programs stored on the memory card.

12. The memory card system of claim 1, wherein the host identifies application programs that are stored on the memory card from the application program index without having to first execute an application program stored on the memory card.

13. The memory card system of claim 1, wherein one or more of the application programs stored on the memory card include a first component application that is executed by the host and a second component application that is executed by the memory card.

14. The memory card system of claim 1, wherein a specification of the memory card defines application titles corresponding to each bit of the application program index.

15. A memory card comprising:
   a memory unit storing an application program index, the application program index comprising a list of application programs stored on the memory card;
   a central processing unit writing/reading data in/from the memory unit in response to externally input commands; and
   an input/output unit controlled by the central processor unit, transceiving the commands and data,
   wherein the central processing unit sends the application program index to an external system in response to a one of the commands that requests the application program index and the external system identifies application programs that are stored on the memory card from the application program index, wherein:
      the external system identifies application programs that are stored on the memory card from the application program index without having to first execute an application program stored on the memory card; and
      the application program index comprises a single word of a predetermined number of bits, each bit of the application program index corresponding to an application program and indicating whether the corresponding application program is or is not installed on the memory card.

16. The memory card as set forth in claim 15, wherein the input/output unit comprises:
   a command signal line accepting the commands and transferring responding signals for the commands; and
   a data signal line transceiving the data.

17. The memory card as set forth in claim 16, wherein the central processing unit sends the application program index through the command signal line.

18. The memory card as set forth in claim 16, wherein the central processing unit sends the application program index through the data signal line.

19. The memory card as set forth in claim 15, which is a multimedia card or a secure digital card.

20. The memory card of claim 15, wherein one or more of the application programs stored on the memory card include a first component application that is executed by the external system and a second component application that is executed by the central processing unit.

21. A method of performing an application program from a memory card, comprising:
   requesting an application program index from a memory card, the application program index comprising a list of application programs stored on the memory card;
   accepting the application program index;
   identifying application programs stored on the memory card from the application program index; and
   executing at least one identified stored application program listed in the application program index, wherein:
      application programs that are stored on the memory card are identified from the application program index without having to first execute an application program stored on the memory card; and
      the application program index comprises a single word of a predetermined number of bits, each bit of the application program index corresponding to an application program and indicating whether the corresponding application program is or is not installed on the memory card.

22. The method of performing an application program from a memory card as set forth in claim 21, additionally comprising:
   showing the application program index on a display unit after accepting the program index; and
   receiving a signal, which selects at least one application program of the application program index, from a user;
   wherein the step of executing at least one application program of the application program index comprises executing the selected application program in response to the signal.

23. The method of claim 21, wherein one or more of the application programs stored on the memory card include a first component application that is executed by a host and a second component application that is executed by the memory card.

* * * * *